No. 828,392. PATENTED AUG. 14, 1906.
H. EBERT.
SHUTTER FASTENER.
APPLICATION FILED DEC. 7, 1905.
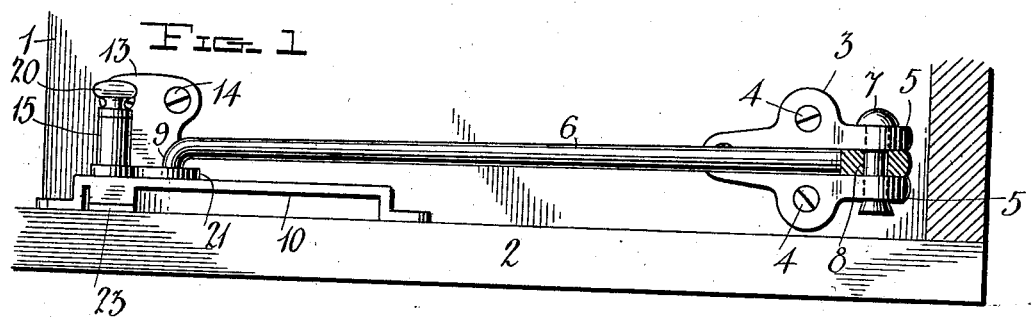
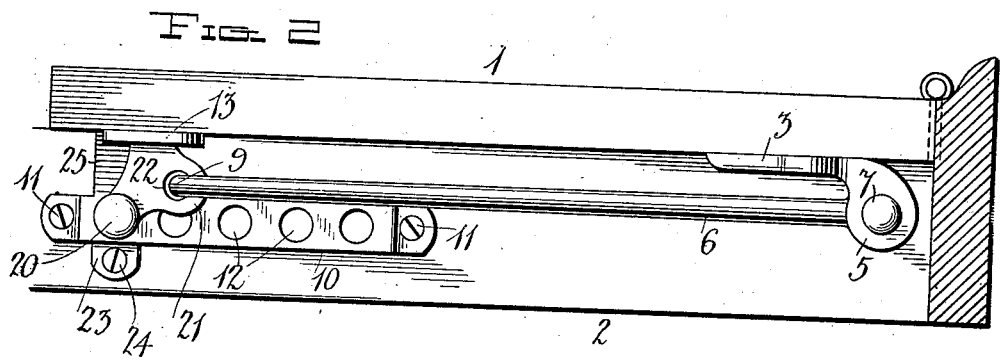
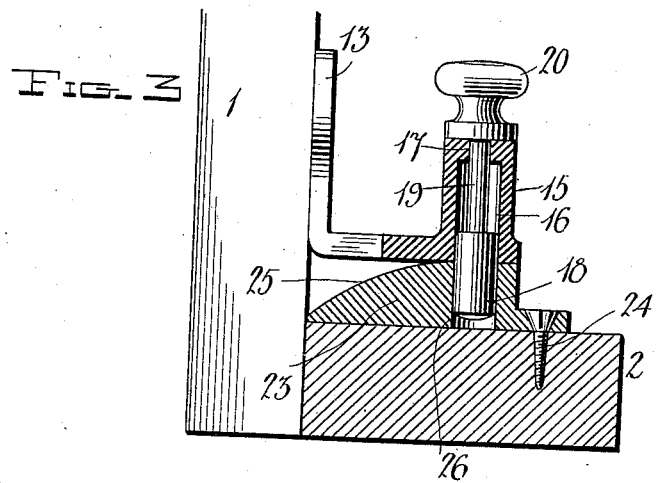
Witnesses
Inventor
Harry Ebert
by H. B. Wilson
Attorney

UNITED STATES PATENT OFFICE.

HARRY EBERT, OF FREDERICK, MARYLAND.

SHUTTER-FASTENER.

No. 828,392.

Specification of Letters Patent.

Patented Aug. 14, 1906.

Application filed December 7, 1905. Serial No. 290,787.

*To all whom it may concern:*

Be it known that I, HARRY EBERT, a citizen of the United States, residing at Frederick, in the county of Frederick and State of Maryland, have invented certain new and useful Improvements in Shutter-Fasteners; and I do declare the following to be a full, clear, and exact description of the invention, such as will enable others skilled in the art to which it appertains to make and use the same.

This invention relates to shutter-fasteners or shutter-bowers; and one of the principal objects of the same is to provide a more reliable and efficient means for locking the shutter when fully closed.

With the devices in present use for locking shutters when a shutter is suddenly blown to or closed the locking device, usually consisting of a pivoted member, is liable to be lifted from its locking position by the jar of the shutter against the window-frame.

It is the object of my invention to overcome this defect in shutter-fasteners and to provide reliable and efficient means for insuring the proper locking or fastening of the shutter should it be suddenly blown to a closed position or when the shutter is slammed to.

Another object is to provide a device of this character which will be composed of comparatively few parts, of simple construction, and which may be produced at slight cost.

These objects are obtained by means of the construction illustrated in the accompanying drawings, in which—

Figure 1 is a side view of a shutter-fastener made in accordance with my invention and showing the same attached to a broken-away portion of a shutter and window-sill. Fig. 2 is a transverse section of the window-frame and showing my shutter-fastener in plan view, and Fig. 3 is a sectional view of my gravity bolt or lock when in position for holding the shutter closed.

Referring to the drawings for a more particular description of my invention, the numeral 1 designates a shutter, and 2 is a window-sill. Fixed to the shutter upon the inside near the bottom of the same is a bearing-plate 3, attached by screws 4 to the shutter near its outer edge. Spacing-lugs 5 5 are formed on the bearing-plate, and registering perforations are formed in said lugs. A shutter-bower comprising a rod 6 is pivoted between the lugs 5 by means of a bolt or pintle 7, which passes through perforations in the lugs 5 and through an eye 8, formed on the shutter-bower. The opposite end of the shutter-bower is bent downward to form a catch 9. A catch-plate or keeper 10 is secured by screws 11 to the window-sill 2 and provided with a series of perforations 12 to accommodate the catch 9 and to be used in bowing the shutter or adjusting it in a more or less open condition. These parts may be of the usual or any suitable construction.

My shutter-fastener comprises a casing consisting of a bracket portion 13, adapted to be secured to the shutter by a screw 14, and a bolt-barrel 15, having an enlarged recess 16 in the lower end thereof and a smaller perforation 17 at its upper end. A gravity-bolt provided with an enlarged end 18 and a shank 19 is fitted to the barrel and provided with a weighted knob 20. At the side of the bolt-barrel a lug 21 is formed thereon, said lug being provided with a perforation 22 for the purpose of holding the catch 9 when the shutter is locked closed by means of a gravity-bolt. The bolt-keeper 23 is secured at the top of the sill by means of a screw 24, and its outer end is beveled, as at 25, to permit the lower end 18 of the gravity-bolt to ride upward until it drops into the locking-recess 26.

The operation of my invention may be described as follows: When the parts are in the position shown by Fig. 2 of the drawings, the shutter is locked in closed position. When it is desired to bow the shutters, the gravity-bolt is lifted from the keeper-plate and the catch 9 is removed from the perforation 22 in the lock and inserted into any of the perforations 12 to bow the shutter. Should the shutter be suddenly blown to or suddenly brought to a closed position by any means, the gravity-bolt would ride upward upon the beveled portion 25 of the keeper 23 and drop into the locking-recess 26, and thus prevent the shutter from again opening until the gravity-bolt has been lifted from the locking-recess.

From the foregoing it will be observed that my shutter-fastener is reliable in operation, not depending upon a pivoted catch to lock the shutter in closed condition.

Various changes in the form, proportion, and the minor details of construction may be resorted to without departing from the principle or sacrificing any of the advantages of this invention.

Having thus described my invention, what I claim as new, and desire to secure by Letters Patent, is—

1. A shutter-fastener comprising a bracket secured to the inner side of the shutter and provided with a bolt-barrel, a gravity-bolt mounted in said barrel and perforations formed in said bracket to accommodate the shutter-bower, and a beveled keeper-plate adapted to be secured to the window-sill, and provided with a locking-recess, substantially as described.

2. A shutter fastener and bower consisting of a bracket secured to the inner surface of the shutter, a shutter-bower rod pivoted to said bracket and provided with a catch at its opposite end, a perforated catch-plate secured to the window-sill and provided at its outer end with a beveled surface and a locking-recess, a gravity-bolt mounted in a barrel formed on a bracket secured to the shutter and provided with a perforation to accommodate the end of the shutter-bower, substantially as described.

In testimony whereof I have hereunto set my hand in presence of two subscribing witnesses.

HARRY EBERT.

Witnesses:
MARGARET EBERT,
T. HARRY MILLER.